R. W. COFFEE.
POWER TRANSMISSION GEARING.
APPLICATION FILED JUNE 25, 1906.
918,658.
Patented Apr. 20, 1909.
4 SHEETS—SHEET 1.
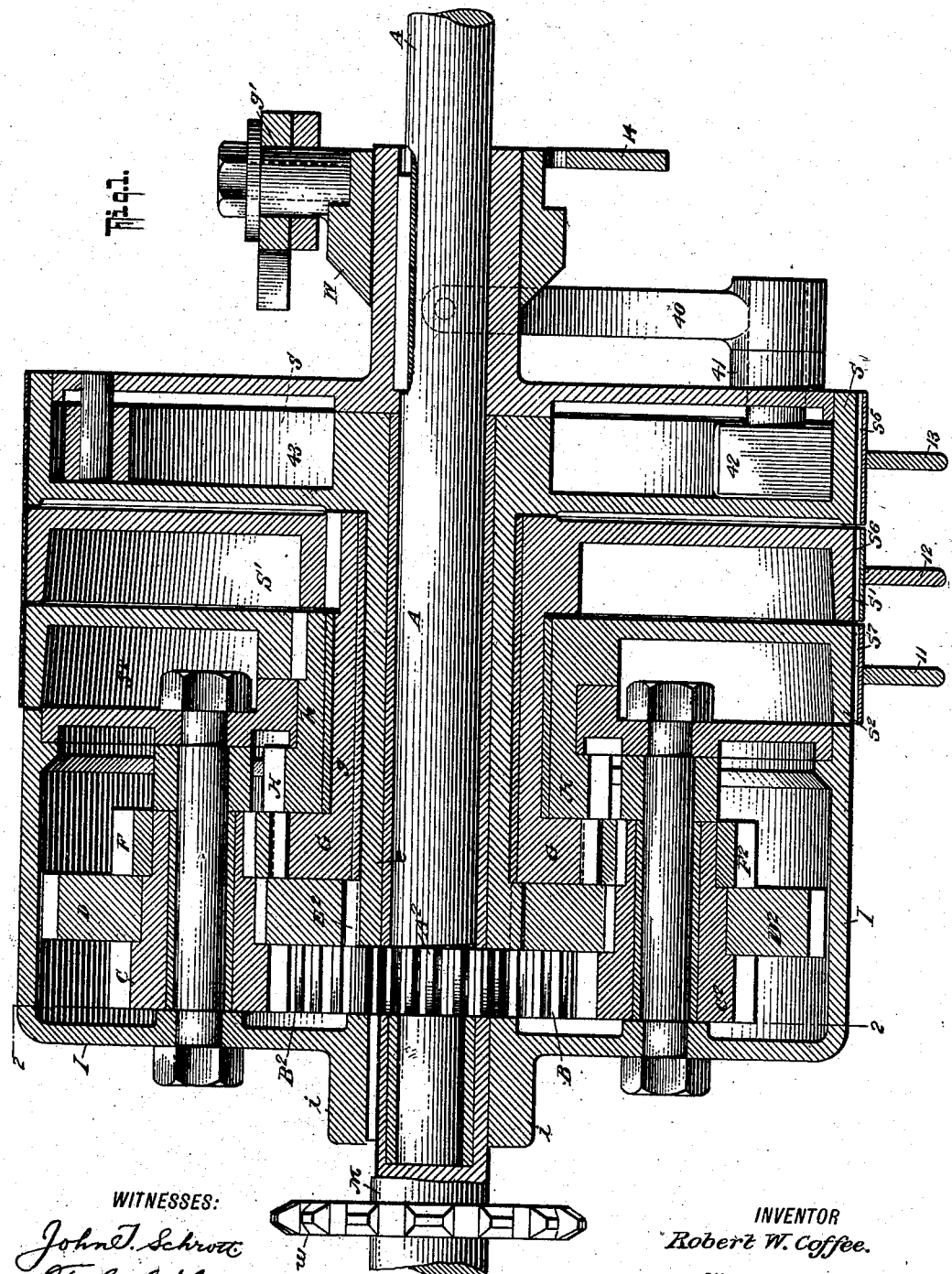
WITNESSES:
John T. Schrott
F. C. Gibson.
INVENTOR
Robert W. Coffee.
BY
Fred G. Dieterich
ATTORNEYS R. W. COFFEE.
POWER TRANSMISSION GEARING.
APPLICATION FILED JUNE 25, 1906.
918,658.
Patented Apr. 20, 1909.
4 SHEETS—SHEET 2.
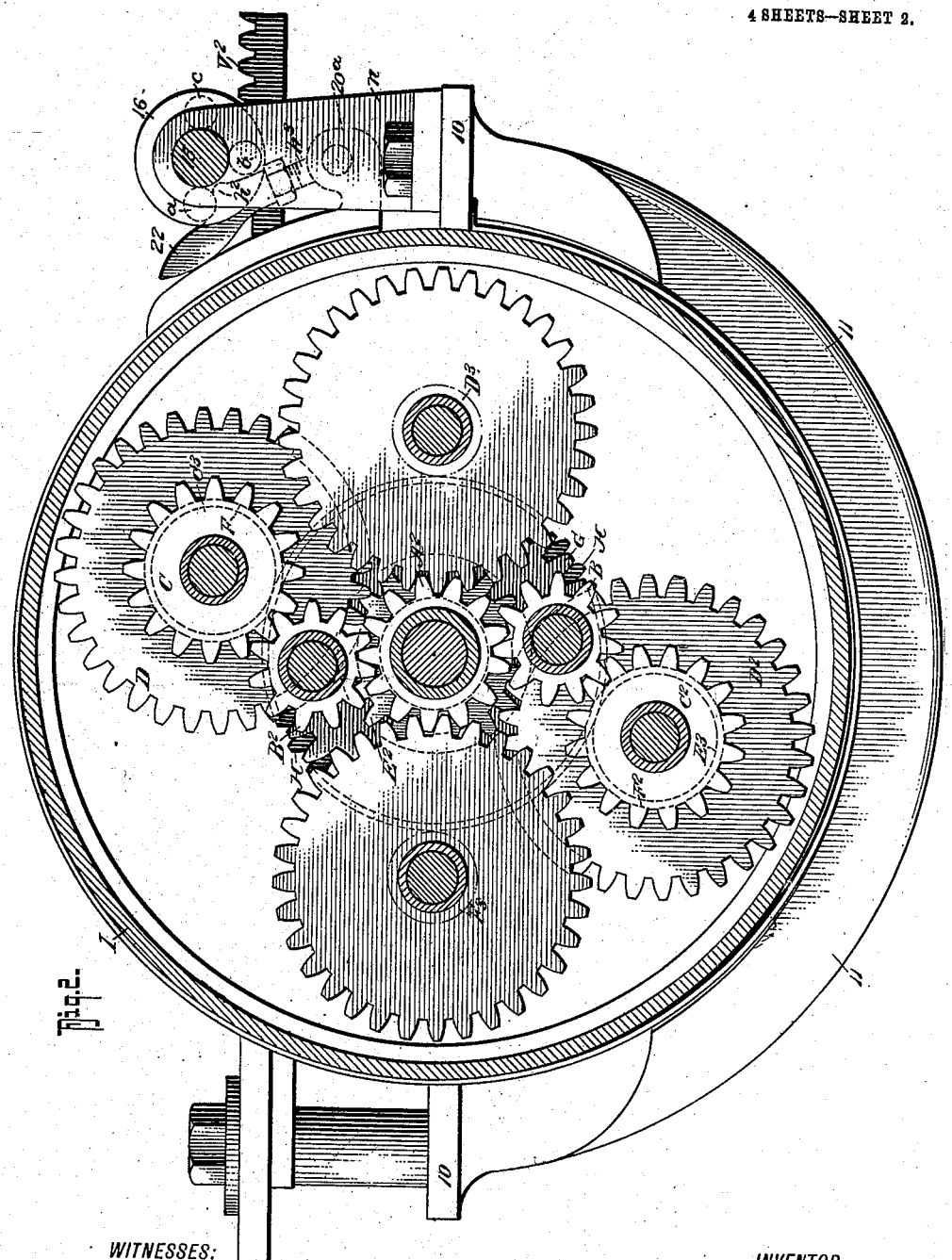
WITNESSES:
John T. Schrott
F. C. Gibson
INVENTOR
Robert W. Coffee.
BY
Fred G. Dietrich & Co.
ATTORNEYS

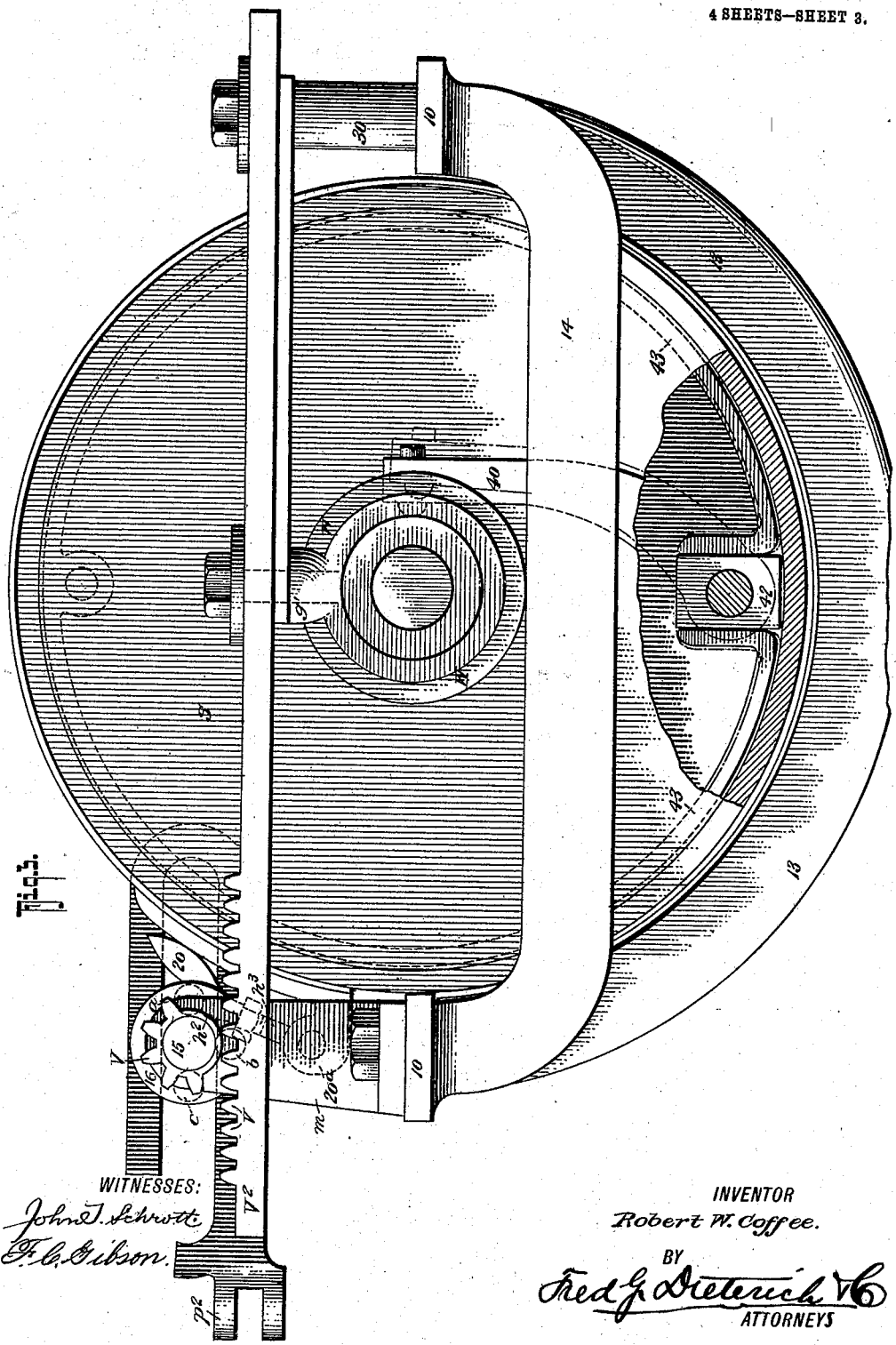

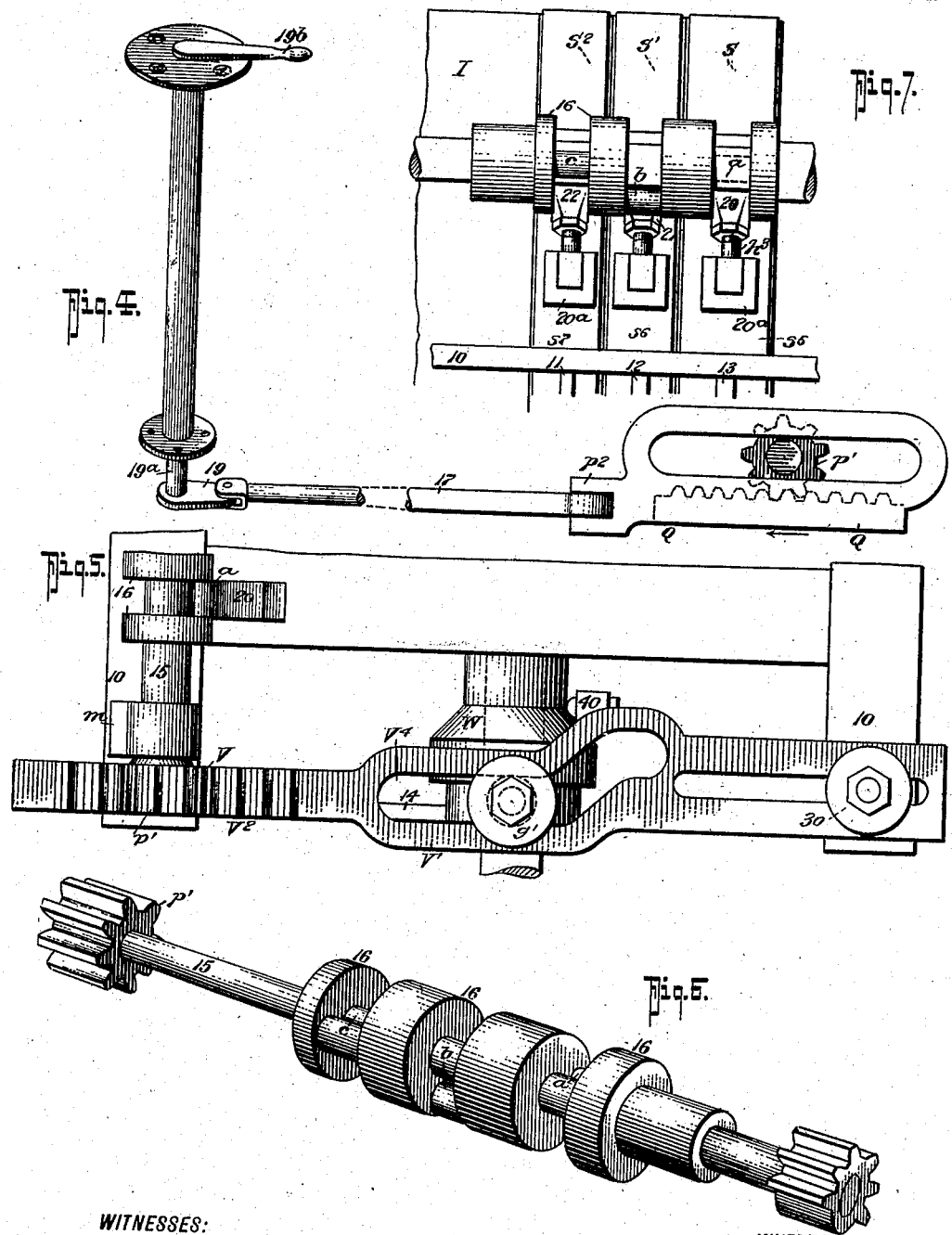

UNITED STATES PATENT OFFICE.

ROBERT W. COFFEE, OF RICHMOND, VIRGINIA, ASSIGNOR TO LEWIS M. KEIZER, OF BALTIMORE, MARYLAND.

POWER-TRANSMISSION GEARING.

No. 918,658.   Specification of Letters Patent.   Patented April 20, 1909.

Application filed June 25, 1906. Serial No. 323,250.

*To all whom it may concern:*

Be it known that I, ROBERT W. COFFEE, residing at Richmond, in the county of Henrico and State of Virginia, have invented a new and Improved Power-Transmission Gearing, of which the following is a specification.

My present invention, which relates generally to improvements in power transmission gear mechanisms, more particularly seeks to provide a simple, easily manipulated and economically constructed means for effecting the required changes of rate of speed in planetary gear mechanisms, whereby three speeds forward and one reverse speed are obtained, and by the use of which, possibility of two different acting sets of gears being thrown into action at the same time, is overcome, and whereby a powerful and positive control of the direction and rate of speed of the gear mechanism is maintained.

My invention, in its generic nature, comprehends in combination with a planetary gear mechanism in which is included a plurality of rotatable drums, and brake bands for holding said drum from rotation, a means coöperatively connected with the several drums and having adjustments and differential actions, whereby, when set to the predetermined position, any one of said drums may be held from rotation, a supplemental or clutch device for one of the brake controlled drums also arranged to be set by the means aforesaid, and a single lever connected with said means for setting the same to differential positions for effecting the several adjustments of the drums whereby to change the rate of speed and direction of the gear mechanism, as described.

In its more complete nature, my invention consists in certain general and specific arrangement and combination of parts, all of which will be hereinafter fully explained, specifically pointed out in the appended claims and illustrated in the accompanying drawings, in which:—

Figure 1, is a vertical longitudinal section of a gear mechanism constructed to transmit three different speeds of movement forward and one reversed speed of movement and in which is included two brake equipped drums and one drum, with which coöperates a band brake and a clutch brake device for which my construction of lever actuated means is more especially adapted. Fig. 2, is a side elevation thereof, the multi cam shaft, the actuating rack and the clutch shifting lever being in transverse section on the line 2—2 in Fig. 1, Fig. 3, is an end elevation of the complete mechanism, the split clutch ring and the ring spreader member being partly indicated in dotted lines. Fig. 4, is a detail view of the rack mechanism and the single controlling lever connected therewith for setting the multi cam shaft. Fig. 5, is a top plan view of a portion of the drums and illustrating the clutch shifting lever and the means for actuating the same. Fig. 6, is a detail perspective view of the multi cam shaft with its driven and its driver pinions. Fig. 7, is a detail view of the pivotally mounted "knees" hereinafter referred to.

Before describing in detail the structure of the lever mechanism and the means for transmitting the lever power to the different brake bands and the clutch device that controls the several adjustments of the several drums that form a part of the transmission gearing, a brief description of a form of planetary gear mechanism for which my lever and lever actuating means are more especially adapted, is here deemed proper.

The gear mechanism which will now be generally described, *per se*, forms the subject matter of another application filed by me, May 16, 1906, Serial Number 317171, and in the accompanying drawings, it is generally shown in Fig. 1, by reference to which it will be seen, the driving shaft A has an integral sun pinion $A^2$, and the pinion end of the shaft A is journaled in an extension M which forms a continuation of the shaft A and which is fixedly connected to the hub $i$ of a casing I which rotates with the member M upon which the transmission sprocket wheel $w$ is mounted as shown, the other end of shaft A, in practice, communicates with any suitable source of motive power.

The pinion $A^2$ meshes with intermediate pinions B and $B^2$ and these mesh with orbital gears C and $C^2$, which together with pinions B and $B^2$, are carried by the casing I. Gears C and $C^2$, are fixedly joined with the gear members D—$D^2$, F—$F^2$, the former meshing with a pinion $E^2$ on a long hub $e$ mounted on the shaft A and integrally formed with the outermost one S of the three drums, S, S' and S², while the gear members F, F² mesh with a sun gear G, fixedly held on a hub $g$ that rotates on hub $e$ and which forms a part of the second drum S'. The other or third drum S² has a hub $h$ that carries a sun gear H with which mesh orbital gears C³, D³, E³ and F³, see Fig. 2, carried by the casing I and mounted in an axial plane about 90 degrees to the other orbital gears C—C², D—D², F—F², the latter comprising both the intermediate and slow forward speed gears while the orbital gears C³, D³, E³ and F³ constitute the reversing gear members, and these latter gears are correlatively in mesh with the driving pinion A² and the sun gear H.

Briefly stated, the operation of the transmission gearing is as follows:—If drum S is held by its band, it, together with the pinion E², becomes stationary and the orbital gears will revolve around the sun gear A² in the same direction of driving shaft A, carrying with them the casing I and the shaft portion M at a ratio of one and five eights, more or less, slower speed than shaft A. When very slow forward speed is desired, drum S' is held fast and then orbital gears C, D and F, and C², D², and F² will revolve around the sun gear G which effects the low ratio forward speed. To produce a high speed, the clutch mechanism is thrown into action which locks all gears within gear casing, causing rotation of casing I, and shaft member M to revolve same speed as shaft A. The reverse movement is accomplished by holding drum S² with its sun gear H, which causes orbital gears C³, D³, E³ and F³ to revolve in opposite directions, carrying with them casing I and its shaft member M in a direction reverse to driving shaft A.

Having thus outlined the construction and manner in which the gears operate, I shall now describe in detail my single lever actuated means for holding the several drums S—S' and S² and setting the clutch mechanism.

By referring now more particularly to Fig. 3, it will be noticed, my improved mechanism is mounted in part on a base 10 having four integral annular ribs 11, 12, 13 and 14. At one side, the complete mechanism includes a pair of opposing pedestals $m$—$n$ in which is journaled, what I term, a multi or rotary cam shaft 15, having a series of integral annular collars 16—16 with which coöperate three radially disposed cam lugs $a$, $b$, $c$, arranged on quarters whereby the lug $b$ is equi-distant or in a plane of ninety degrees from lugs $a$ and $c$, while the latter are disposed diametrically opposite each other, the purpose of which will presently appear.

The shaft 15 is held for a complete revolution in its bearings by means of rack Q which engages a pinion $p'$ on the outer end of the shaft 15, and which has a bifurcated extension $p^2$ with which pivotally engages the link member 17 that joins with the crank end 19 of a controlling means consisting of the vertical rod 19ª rotatably mounted in suitable bearings, to the lower end of which is joined the crank 19, and to the upper end of which is fastened the hand lever 19ᵇ, which, in practice, operates over a suitable indicator dial, by means of which the operator can instantly and conveniently set the lever to rotate the rod 19ª to effect the desired movements of the rack Q whereby to set the shaft 15 to the several positions hereinafter particularly referred to.

20, 21 and 22 designate cam knees, hinged at their lower ends to bearing members 20ª secured to the brake bands S⁵, S⁶, S⁷, and said knees, of which there is one for each brake band, include a heel member $h^2$ adjustably connected to threaded eye bolts $h^3$ whereby to provide for compensating for the wear on the brake bands.

The several brake bands S⁵, S⁶, S⁷, have one end connected to the base member 10, their other end passing over the drums and having the knees secured thereto, such connection of the bands preventing the weight thereof from falling on their respective drums and causing frictional contact and loss of power thereby when it is desired that the drums run free, this being an important advantage in gear mechanisms, it being understood that in installing my annular ribbed frame mechanism on a vehicle, it is supported by suitable hangers secured to the ribs in such manner as to avoid the possibility of the bands contacting with their respective drums, as stated.

The operation of the parts referred to in connection with other parts hereinafter set out is explained as follows:—The several cam lugs $a$, $b$, and $c$, are respectively located on the shaft 15 to coact respectively with the knees 20. Now assuming the shaft to have been rotated through the backward movement of the rack Q to bring the lug $a$ over the heel of knee 20, a forward thrust of the rack Q will cause the shaft 15 to rotate forwardly in the direction indicated by the arrow and in so doing, it will force the knee 20 downwardly and thereby bring the brake band in tight frictional contact with drum S, thus placing the intermediate speed transmission gears in operation. By continuing the movement of rack P forward, lug $a$ pulls the knee down to tighten the band to its fullest capacity and then the lug $a$ slips off the heel portion of the knee 20 and brings the gear V on the inner end of shaft 15 in mesh with a horizontal rack member $v^2$, formed on one end of a slotted cam plate V', guided at one end on the post 30 that rises from the framing, and thereby slides the cam plate in the direction of its length, which causes its cam slot V⁴, in which projects the stud $q'$ of the cam W to thereby force the clutch inward, which shifts the lever 40, the outer end of which is fulcrumed in the disk plate 41, rotatable with the power shaft, projects within the drum casing S and carries at such end a spreader block 42 that acts on the expansible split brake ring 43 which then frictionally engages the said drum casing and thereby holds the casing and all gears locked, and effects the high speed. The controlling or hand lever is now at its forward limit. Now if a reverse movement of the gearing is desired, the hand or controlling lever is brought back to its full limit which will bring lug $c$ in position to engage knee 22, and by a forward movement of the hand lever, the band for reverse drum $S^2$ will now grip said drum to obtain the reverse action of the gearing. If the forward movement of the hand lever is continued, lug $c$ will disengage knee 22. A backward movement of the said lever will bring lug $b$ in position to engage knee 21 and then a forward movement of the said lever will cause lug $b$ to engage knee 21 and thereby cause the brake band to grip the drum $S'$ and thus hold the slow forward speed drum to get the low speed.

What I claim is:—

1. In a gearing of the character stated, a planetary gear mechanism having a plurality of rotatable drums, an independent brake device for each drum; and a lever controlled mechanism for separately applying all of said brake devices as the lever is moved in a single direction.

2. In a gearing of the character stated, a planetary gear mechanism including a plurality of rotatable drums and an independent brake device for each drum combined with a single lever controlled mechanism for successively applying all of said brake devices as the lever is moved in a single direction.

3. In a power transmission mechanism, a planetary gearing, said gearing comprising a plurality of rotatable drums, and a brake device for each of said drums, together with a clutch mechanism coöperating with one of said drums; combined with a single lever actuated mechanism for setting the brake device of one of said drums and upon further movement in the same direction setting the clutch mechanism and then upon further movement in the same direction setting the brake device for the other drum.

4. In a power transmission mechanism, a planetary gearing, which comprises a plurality of rotatable drums, a brake device for each of said drums and a clutch mechanism coöperating with one of said drums combined with a single lever actuated means operating under movement in a single direction to independently set all of said brake devices for said drums, and also set said clutch mechanism.

5. A multiple speed transmission mechanism comprising a plurality of rotary drums, a clutch mechanism coöperating with one of said drums, a brake band device for coöperating with one of said drums, means for independently applying the brake band and the clutch mechanism, and a single lever for actuating all of the aforesaid means when the lever is moved in one direction.

6. A multiple speed transmission mechanism, comprising a plurality of rotary drums, a brake band for each of said drums, means for applying the brake bands independently, and a single actuating lever coöperating with said means to successively apply all the bands as the lever is moved in one direction, said lever being adapted for different adjustments.

7. A multiple speed transmission mechanism comprising a plurality of rotary drums, a brake band for each of said drums, a clutch mechanism for one of said drums, and means operating under one movement for independently applying the several brake bands and the clutch mechanism, said means including a single operating lever.

8. A multiple speed transmission gear mechanism comprising a planetary gear device, a plurality of rotary drums, a brake band for each of said drums, means combined with said brake bands and having different adjustments to actuate either of said brake bands, and a single operating lever coöperating with said brake band actuating means for effecting the different adjustments of all the bands as the lever is moved in a single direction.

9. A multiple speed transmission gearing comprising a plurality of rotary drums, a brake band for each drum; in combination with a rotary cam shaft having a series of cams for coöperatively engaging with their respective brake bands, and means for rotating said shaft to set its cams to co-act with their respective brake bands, and a single lever mechanism for actuating said rotating means to rotate said shaft in one direction to successively actuate all of the brake bands.

10. A multiple speed gearing comprising a plurality of rotary drums, a brake band for each drum, an expanding clutch ring for one of said drums, a shiftable clutch ring expanding member, a tightener for each brake band, a rotary cam shaft having a series of rotatable cams to engage said tighteners, a gear on said cam shaft, a shifting bar engageable by said gear at times and actuated thereby, connections between said bar and said expansible clutch member to actuate said clutch member from said bar, and means connected with the rotary cam shaft to rotate the same.

11. A plurality of drums, a brake band for each drum, a cam engaging member carried by each band, a rotary cam shaft for engaging said cam engaging members to move them to bring the bands into a gripping position on the drums, and a lever and rack mechanism for actuating said shaft.

12. A plurality of rotatable drums, a supporting frame therefor, a brake band for each drum secured at one end to the supporting frame and passed over the respective drum, a member for each band connected to the other end of the respective band, means for actuating said members to selectively draw the bands taut on the respective drums, and a single lever for operating said actuating means.

13. A transmission gearing of the character described, comprising a planetary gear mechanism, a plurality of rotary drums, a supporting frame therefor, a brake band for each of the drums, said brake band secured to and mounted upon said frame and having a portion extended over the drum rings, a member having a heel portion secured to each of said bands; a rotary shaft having a series of cams, one to engage each heel portion, a pinion mounted on said shaft and a lever and rack mechanism engaging the pinion to turn the shaft.

14. In a transmission gearing, a planetary gear mechanism, comprising a plurality of rotary drums, a drive shaft upon which said drums are mounted, a supporting frame for said drums, a brake band for each of said drums, said bands being connected at one end to the frame and passed over said drums; a knee member pivotally mounted on the other end of each drum band, a rotary cam shaft having cams co-acting with the several pivoted knees, and a lever and rack mechanism for actuating the cam shaft.

15. In a transmission gearing, a main frame, a drive shaft mounted thereon, a planetary gear mechanism supported by and connected with said shaft, said gear mechanism including a rotary drum mounted upon the drive shaft and a brake band connected to the supporting frame at one end and passed over the drum; a knee pivotally mounted on the free end of the brake band and a lever controlled mechanism to bring the brake band in tight frictional engagement with the drum.

16. In a multiple speed gearing, a supporting frame, a drive shaft mounted thereon, a planetary gear mechanism including a rotary drum loosely mounted on the drive shaft, and an expansible clutch member mounted within the drum; a tiltably mounted rock lever, a spreader block carried thereby for engaging the expansible clutch member, means mounted on the drive shaft to engage said lever, and a rack and pinion device for shifting said lever engaging means to rock the rock lever.

17. In a transmission gear, a plurality of rotary drums, a brake band for each drum, and a member carried by each brake band, mechanism operating under a uni-directional movement to successively engage said members to tighten the brake bands on their respective drums, and a single lever actuated device for setting said mechanism to engage either one of the tightening means.

18. In a transmission gearing, a plurality of drums, a brake band for each drum, and a clutch means for one of said drums, a tightener means for each band, and a single lever actuated device operating under a movement in one direction for setting any of the several tightener means and the clutch mechanism at times.

19. In a transmission gearing, the drums S', S² and S, a brake band for each of the drums, a split clutch ring mounted within the drum S to engage it, a clutch ring expander rotatable with the drive shaft, a tightener means for each brake band comprising a member carried by the brake band, a rotary shaft having a series of cams for engaging the several brake band members at times, a sliding rack, means engaging said sliding rack and said clutch ring expander to operate the expander at times, a means on the rotary shaft to engage said rack to operate the rack, and a single lever actuated mechanism coöperating with the rotary shaft for rotating the latter.

20. In a transmission gear mechanism, a series of rotatable drums and a series of brake bands, one for each drum combined with a single actuating means for selectively operating either of said brake bands when said actuating means is moved in one direction.

ROBERT W. COFFEE.

Witnesses:
 FREDK. B. HOFFMAN,
 J. ALEX. HILLEARY, Jr.